(12) United States Patent
Manzardo et al.

(10) Patent No.: US 8,275,411 B2
(45) Date of Patent: Sep. 25, 2012

(54) METHOD AND APPARATUS FOR ALWAYS-ON VOICE CLIENT SERVICE ON MOBILE COMPUTING DEVICES

(75) Inventors: Marcel Manzardo, Los Gatos, CA (US); William J. Beyda, Cupertino, CA (US)

(73) Assignee: Siemens Enterprise Communications, Inc., Boca Raton, FL (US)

( * ) Notice: Subject to any disclaimer, the term of this patent is extended or adjusted under 35 U.S.C. 154(b) by 1365 days.

(21) Appl. No.: 11/879,636

(22) Filed: Jul. 18, 2007

(65) Prior Publication Data

US 2009/0023471 A1 Jan. 22, 2009

(51) Int. Cl.
*H04M 1/00* (2006.01)

(52) U.S. Cl. ..................... 455/556.1; 370/352

(58) Field of Classification Search ............... 455/556.1, 455/556.2; 379/433.06; 370/352, 401, 419
See application file for complete search history.

(56) References Cited

U.S. PATENT DOCUMENTS

| | | | |
|---|---|---|---|
| 5,303,171 A | 4/1994 | Belt et al. | |
| 5,860,001 A | 1/1999 | Cromer et al. | |
| 5,956,636 A | 9/1999 | Lipsit | |
| 6,065,121 A | 5/2000 | Hobson et al. | |
| 6,145,085 A | 11/2000 | Tran et al. | |
| 6,384,853 B1 | 5/2002 | Shaffer et al. | |
| 6,591,368 B1 | 7/2003 | Ryu | |
| 6,915,346 B1 | 7/2005 | Kato et al. | |
| 7,047,428 B2 | 5/2006 | Bui | |
| 7,103,785 B2 | 9/2006 | Green et al. | |
| 7,675,922 B2 * | 3/2010 | Magendanz et al. | 370/401 |
| 2008/0162682 A1 * | 7/2008 | Ramachandran et al. | 709/223 |

* cited by examiner

*Primary Examiner* — Sam Bhattacharya

(57) ABSTRACT

A telecommunications device including a laptop computer having a telephony soft client. According to embodiments of the present invention, calls may be received even when the laptop computer is turned off. The laptop computer wakes up responsive to detecting an incoming call. In some embodiments, the system checks on a user presence status before waking up the laptop. In some embodiments, the telephony soft client may be quick booted to allow a user to make an emergency telephone call, without fully booting the laptop computer.

20 Claims, 5 Drawing Sheets

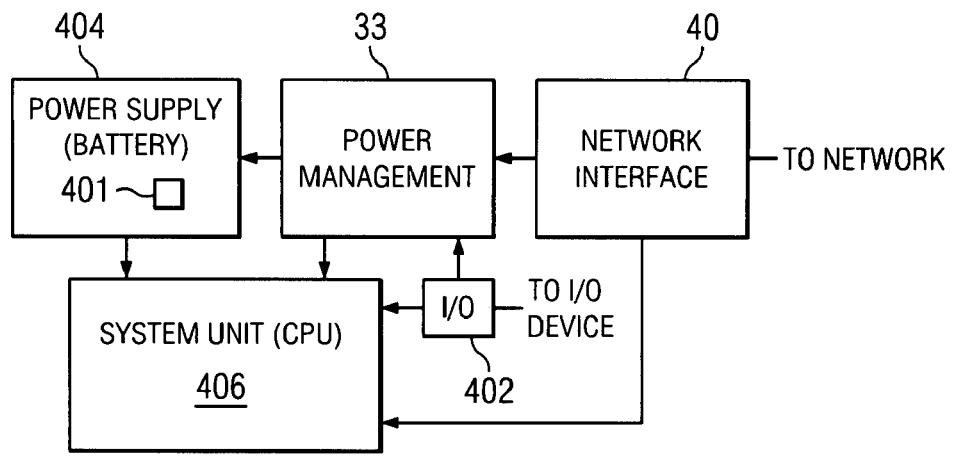
FIG. 4
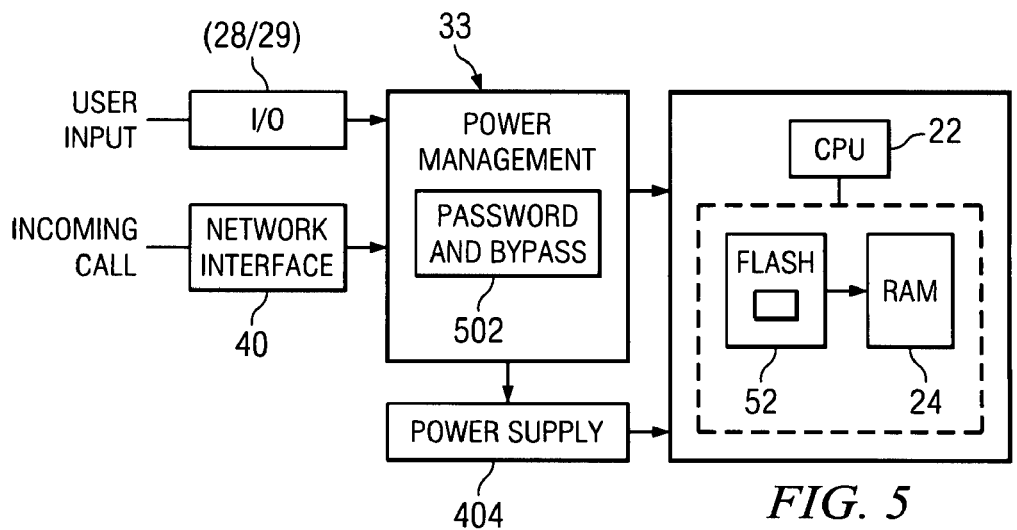
FIG. 5
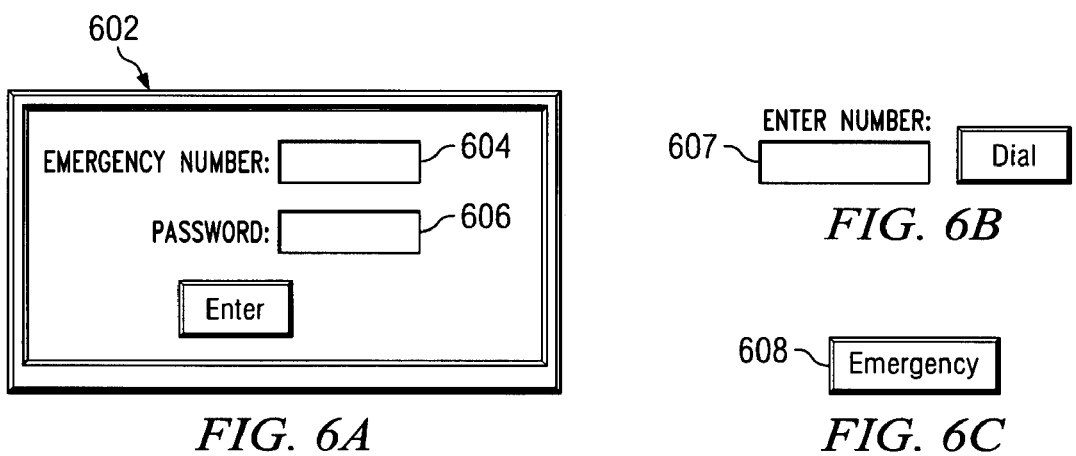
FIG. 6A
FIG. 6B
FIG. 6C

METHOD AND APPARATUS FOR ALWAYS-ON VOICE CLIENT SERVICE ON MOBILE COMPUTING DEVICES

BACKGROUND OF THE INVENTION

1. Field of the Invention

This invention relates to telecommunications systems. More particularly, the invention relates to an improved telephony client for mobile computing devices.

2. Description of the Related Art

Users increasingly desire to be able to make and receive telephone calls at all times. The typical methods for such access are a landline and/or a cellular telephone. A landline, however, is not always available or it can be very expensive, especially for long distance calls. A cellular telephone likewise can be expensive, depending on whether the user is in his service area, or may not be available at all, such as when traveling outside a service area or to a foreign country that employs a different cellular telephone standard.

Because of these difficulties, the use of mobile computing devices, such as laptop or notebook computers, as telephony devices is increasingly common. Such devices typically employ a telephony "soft client" to implement voice over Internet Protocol (VoIP) functionality in order to communicate by voice over a packet network, such as a local area network (LAN) or the Internet.

A disadvantage of the use of telephony soft clients is that calls may be made and received only when the entire mobile computing device is turned on. When a mobile computing device is plugged in to an electrical outlet, this may not be a problem. However, laptop or notebook computers cannot be always on because the battery only provides power for a maximum of several hours.

SUMMARY OF THE INVENTION

A telecommunications device in accordance with embodiments of the present invention includes a laptop computer having a telephony soft client. According to embodiments of the present invention, calls may be received even when the laptop computer is turned off. The laptop computer wakes up responsive to detecting an incoming call. In some embodiments, the system checks on a user presence status before waking up the laptop. In some embodiments, the telephony soft client may be quick booted to allow a user to make an emergency telephone call, without fully booting the laptop computer A laptop computer in accordance with embodiments of the present invention includes a telephony soft client. In some embodiments, the telephony soft client is maintained in flash ROM while the laptop computer is turned off. The telephony soft client loads into memory in a quick boot procedure when an incoming call is detected or it is desired to make an outgoing call. In some embodiments, the entire laptop need not boot.

According to some embodiments of the present invention, the telephony soft client may be active to receive a call even if the laptop computer is password-protected. Access may be restricted to the telephony soft client. According to some embodiments, outgoing emergency calls may be placed without entering the laptop password.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

FIG. 4 is a diagram schematically illustrating embodiments of the present invention.

FIG. 5 illustrates exemplary operation of embodiments of the present invention.

FIG. 6A-FIG. 6C are diagrams of exemplary user interfaces for use with embodiments of the present invention.

DETAILED DESCRIPTION OF EMBODIMENTS OF THE INVENTION

Figure 1:
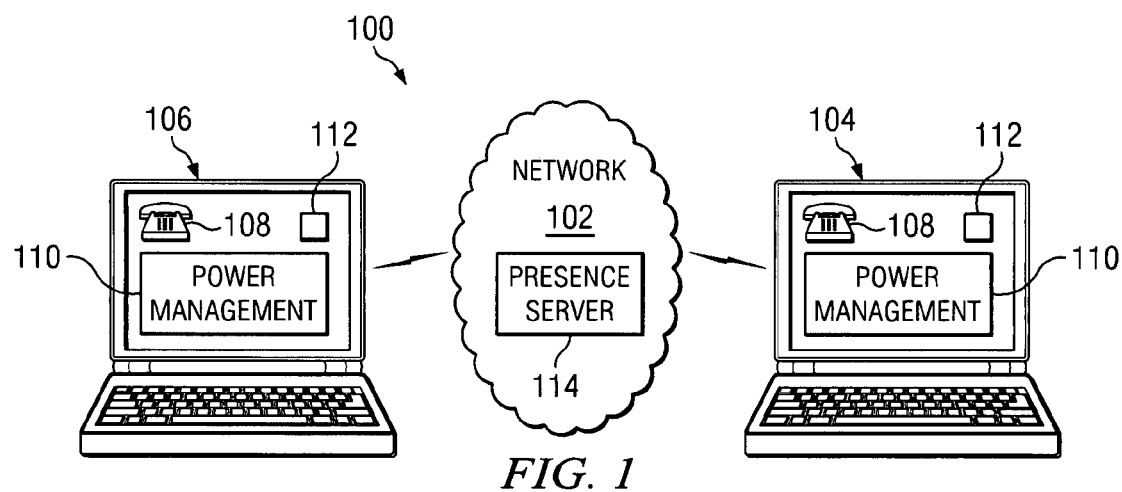
FIG. 1 illustrates an exemplary system according to embodiments of the present invention.

Turning now to the drawings and, with particular attention to FIG. 1, a diagram of a telecommunications system 100 according to an embodiment of the present invention is shown. In some embodiments, one or more of the components of the system 100 may be connected to or in communication with each other via a communication network over which a user may send and receive telephone calls.

The network 102 may be or include the public switched telephone network (PSTN), the Internet, World Wide Web, a local area network, or some other public or private computer, cable, telephone, client/server, peer-to-peer, or communication network or intranet. In some embodiments, the communication network 102 can also include other public and/or private wide area networks, local area networks, wireless networks, data communications networks, or connections, intranets, routers, satellite links, microwave links, cellular or telephone networks, radio links, fiber optic transmission lines, ISDN lines, T1 lines, DSL connections, etc. Moreover, as used herein, communications include those enabled by wired or wireless technology. In some embodiments, some or all of the network 102 may be implemented using a TCP/IP network and may implement voice or multimedia over IP using, for example, the Session Initiation Protocol (SIP).

User devices, such as user devices 104, 106 may be connected to or in communication with the telecommunications network 102. In certain embodiments, the user devices 104, 106 may be implemented as telephones, cellular telephones, PDAs, or mobile computing devices, such as computers, hard or soft clients, etc. For example, user devices 104, 106 may be embodied as desk or laptop personal computers implementing the Windows XP operating system and the Explorer web browser. In addition, the user devices 104, 106 may include telephony and other multimedia messaging capability using, for example, peripheral cameras, Webcams, microphones, and speakers (not shown) or peripheral telephony handsets, such as the optPoint handset available from Siemens Communication, Inc. The telephony client 108 may implement a voice over IP client or may implement a conventional telephone.

In certain embodiments, the system 100 may also include other hardware and/or software components (e.g., gateways, proxy servers, registration server, presence servers, redirect servers, databases, applications, etc.) such as, for example, hardware and software used to support a SIP (Session Initiation Protocol) or other protocol based infrastructure for the system 100 and allow the registration of SIP devices in the system 100.

In implementations in which the user devices are embodied as mobile computing devices, such as laptop computers, the user devices 104, 106 may implement one or more telephony soft client applications 108 including or in communication with power management systems 110 in accordance with embodiments of the present invention, as will be explained in greater detail below. In addition, some user devices in accordance with embodiments of the present invention may include presence clients 112 that may receive and transmit presence information to a presence server 114 and/or other user devices. The presence clients 112 may provide presence information regarding the user, the device, or other users or devices to entities and applications running on the user device. An exemplary presence client system is the OpenScape system, available from Siemens Comm., Inc.

As will be discussed in greater detail below, the user devices 104, 106 are configured to be put into a power-off state. According to embodiments of the present invention, when in this state, backup battery power is provided to the network interfaces so the user devices 104, 106 listen for and may receive incoming calls. When such calls are received, the user devices 104, 106 power up and boot, loading their telephony clients 108 so that telephony operation is possible (typically, according to embodiments of the present invention, by using a quickboot process). In some embodiments, a password protection or computer security system may be bypassed or overridden when an incoming call is received or when an outgoing emergency call is to be made.

For example, in some embodiments, a power-on or other security system is provided. In one typical power-on password protection system, a user must enter a password in order to power up the mobile computing device. In one embodiment, the reception of an incoming call or the making of an outgoing emergency call may be accepted as an override of a power-on password. It is noted that some systems may further provide a resource specific security protection system, also typically protected by password. Embodiments of the present invention, however, may likewise be used to bypass such protection, although discussion herein will focus primarily on power-on protection. Systems for providing power-on password and other protection are known. One such system is described, for example, In U.S. Pat. No. 6,145,085.

Figure 2A:
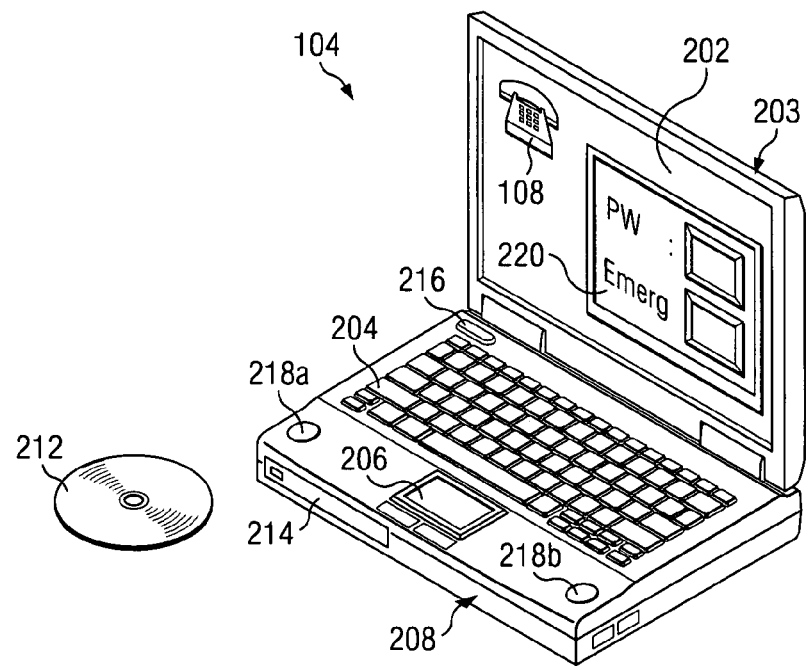
FIG. 2A and FIG. 2B illustrate an exemplary mobile computing device according to embodiments of the present invention.

Turning now to FIG. 2A, a diagram of a mobile computing device 104, such as a laptop computer, that can be used to implement software and hardware embodiments in accordance with the present invention is shown.

FIG. 2A shows a laptop computer 104 that includes a "clamshell" housing or lid 203, display 202, keyboard 204, main housing 208, and cursor pointing device 206. The clamshell housing 203 typically attaches to the main housing 208 via one or more hinges and electrical connections. The inside of the lid 203 typically includes a liquid crystal display or other video monitor 202 for implementing a user interface for the computer.

The cursor pointing device 206 can, for example, include a "track pad" and have one or more buttons for interacting with a graphical user interface (GUI). The main housing 208 houses a CD-ROM (or DVD) drive 214, system memory, and a hard drive (See FIG. 2) which can be utilized to store and retrieve software programs incorporating computer code that implements aspects of the invention, data for use with the invention, and the like. Although optical disk 212 is shown as an exemplary computer readable storage medium, other computer readable storage media including floppy disk, tape, flash memory, system memory, and hard drive can be utilized. Additionally, network storage, e.g., in a network including the Internet can be the computer readable storage medium.

The housing 208 (or indeed clamshell housing 203) may include a one or more microphones 216 and one or more speakers 218a, 218b. Alternatively, one or more of the housing 203, 208 may further include I/O slots, pins, or ports for accepting external peripheral devices such as external USB (Universal Serial Bus) microphones and/or speakers, as well as connecting to the network 102. The housing may further include one or more wireless interface devices for interfacing peripherals and/or for access a wireless network "hot spot."

The mobile computing device 104 may implement a telephony soft client 108 in accordance with embodiments of the present invention. Thus, the telephony soft client 108 provides a graphical user interface for telephony operations, such as dialing, address book, etc. In addition, certain embodiments of the present invention may implement a security bypass interface 220 that may allow a user to bypass a password entry if an emergency call is to be made, or a call is being received, as will be discussed in greater detail below.

Figure 2B:
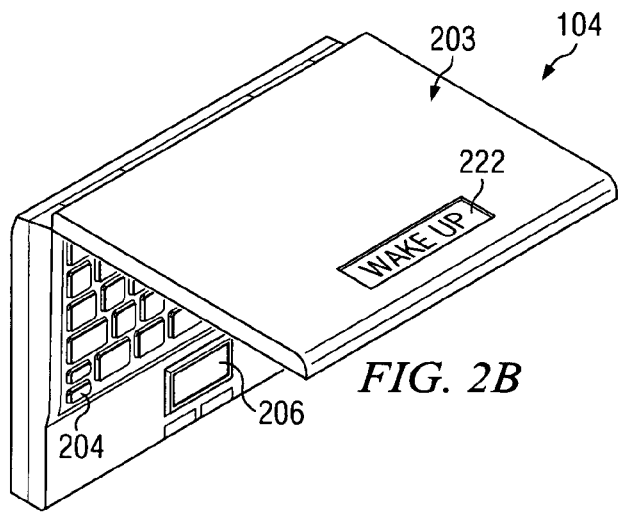

FIG. 2B is a diagram of another view of the computer 104 and, particularly, of the clamshell housing 203. In the embodiment illustrated, the exterior of the clamshell housing 203 includes a wake up control and interface 222. The wake up control 222 may be implemented as one or more touch sensitive pads or hard or soft keys. In operation, as will be explained in greater detail below, the wake up control 222 may be used to activate the soft client 108, particularly for emergency operation.

More particularly, as will be explained in greater detail below, in some embodiments, a user can activate the wake up control 222 in order to make a call. If the call is an emergency call, to a predetermined emergency number, then he will be allowed to bypass the system power-on password entry process. However, if it is a standard call to another number, he will be required to enter the password.

For example, in some embodiments, a full numerical keypad is provided. To make an emergency call, the user can dial the emergency number. If the number matches a stored table of emergency number(s), the call will be allowed, bypassing the security system. Otherwise, the system will wait for a password. In other implementations, the wake up control 222 may be implemented as a single control key or pad, activation of which causes a pre-set emergency number to be dialed. In such implementations, it may be advantageous to provide a cover, such as a sliding cover (not shown) over the wake up control 222, so as to avoid accidental activation. It is noted that such embodiments thus allow dialing of the emergency number without requiring the user to open the lid 203 of the notebook computer.

Other embodiments may make use of the GUI 202 on the interior of the lid 203. For example, to make an emergency call, in such embodiments, the user would press, click on, or otherwise activate the wake up control 222. The mobile computing device 104 will wake and, upon the opening of the lid 203, present an interface such as interface 220 (Other exemplary interfaces are shown in FIGS. 6A-6C). In some embodiments, the user can then select either password entry or emergency number entry. If the user selects emergency number entry, then in certain embodiments, the power-on password is overridden and the telephony client 108 will call the emergency number from a predetermined emergency number or predetermined list of emergency numbers. In other embodiments, no password prompt or option is provided until the number is entered, in which case the mobile computing device 104 will compare the entered number to a predetermined number or list. If there is a match, then the call is allowed. Thus, the user can bypass the power-on security system if he needs to make an emergency call.

Otherwise, the user will need to enter the password to power-on the system. Thus, in order to call out to any number other than an emergency number, the user must enter the system password. It is noted that the interface 220 may be implemented in various ways. Thus, the figures are exemplary only.

Figure 3:
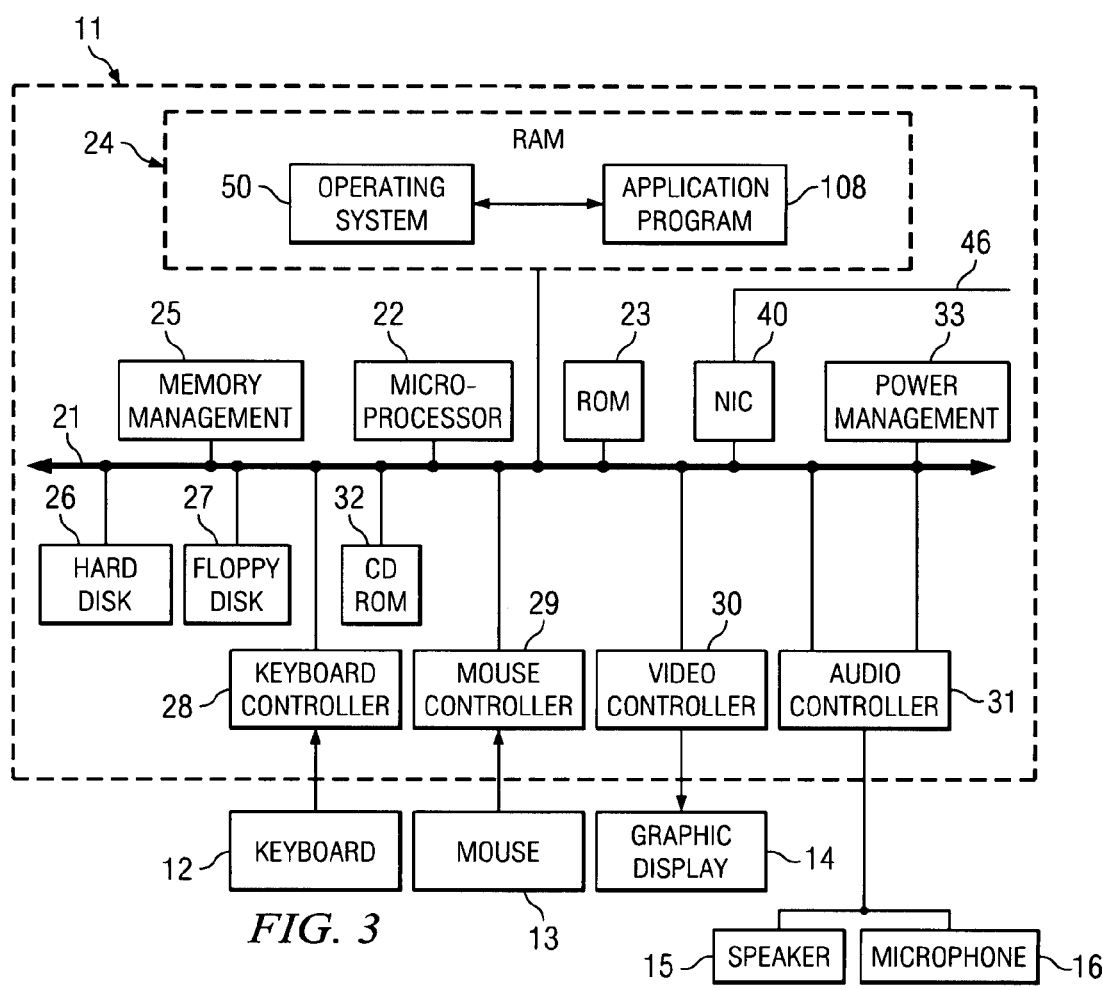
FIG. 3 is a block diagram of the mobile computing device of FIGS. 2A and 2B.

FIG. 3 shows a block diagram of components of the mobile computing device 104, e.g., personal, or laptop computer shown in FIG. 2A and FIG. 2B. In some embodiments, the mobile computing device 104 may implement one more elements of the methods disclosed herein.

The system unit 11 includes a system bus or a plurality of system buses 21 to which various components are coupled and by which communication between the various components is accomplished. A processor 22, such as a microprocessor, is coupled to the system bus 21 and is supported by the read only memory (ROM) 23 and the random access memory (RAM) 24 also connected to the system bus 21. The computer 104 may be capable of high volume transaction processing, performing a significant number of mathematical calculations in processing communications and database searches. A Pentium™ microprocessor such as the Pentium III™ or IV™ microprocessor, manufactured by Intel Corporation may be used for the processor 22. Other suitable processors may be available from Freescale Semiconductor, Inc., Advanced Micro Devices, Inc., or Sun Microsystems, Inc. The processor 22 also may be embodied as one or more microprocessors, computers, computer systems, etc.

The ROM 23 contains among other code the basic input output system (BIOS) which controls basic hardware operations such as the interaction of the disk drives and the keyboard. The ROM 23 may be embodied, e.g., as flash ROM. The RAM 24 is the main memory into which the operating system and applications programs are loaded. The memory management chip 25 is connected to the system bus 21 and controls direct memory access operations including passing data between the RAM 24 and hard disk drive 26 and floppy disk drive 27. A CD ROM drive (or DVD or other optical drive) 32 may also be coupled to the system bus 21 and is used to store a large amount of data, such as a multimedia program or a large database.

Also connected to the system bus 21 are various I/O controllers: The keyboard controller 28, the mouse controller 29, the video controller 30, and the audio controller 31. The keyboard controller 28 provides the hardware interface for the keyboard; the mouse controller 29 provides the hardware interface for the mouse 13 (or other cursor pointing device); the video controller 30 is the hardware interface for the video display 14; and the audio controller 31 is the hardware interface for the speakers 15 and microphone 16. It is noted that while the various I/O controllers are illustrated as discrete entities, in practice, their functions may be performed by a single I/O controller known as a "super I/O." Thus, the figures are exemplary only.

The speakers 15 and the microphone 16 allow for audio communication during telephony operation. In operation, keyboard strokes are detected by the keyboard controller 28 and corresponding signals are transmitted to the microprocessor 22; similarly, mouse movements (or cursor pointing device movements) and button clicks are detected by the mouse controller and provided to the microprocessor 22. Typically, the keyboard controller 28 and the mouse controller 29 assert interrupts at the microprocessor 22. In addition, a power management system 33 may be provided which causes the computer to enter a power down mode if no activity is detected over a predetermined period. The power management system 33 may also cause the system to power up in response to predetermined commands, as will be explained in greater detail below. In addition, a screen saver disabler 54 may be provided, which may function to disable the power management system's power down function during a telephone call. Such a system is described in U.S. Pat. No. 6,384,853, which is hereby incorporated by reference in its entirety as if fully set forth herein.

Further, as will be explained in greater detail below, the power management system 33 is configured to power up or turn on the mobile computing device 104 responsive to reception of call setup signals or in response to the emergency wake commands, in accordance with embodiments of the present invention.

One or more network interfaces 40 enable communication over a network 46, such as a packet network like the Internet. The network interfaces 40 may be implemented as wired or wireless network interfaces operating in accordance with, for example, one or more of the IEEE 802.11x standards and may also implement an IP telephony interface. More particularly, the network interface 40 may include or implement an H.323 Recommendation interface, or SIP interface, to allow for telephony or multimedia communications via a packet switched network, as will be explained in greater detail below. In addition, as will be explained in greater detail below, the network interface 40, as well as the I/O interface (s), may include or be provided with a battery backup, to provide power when the mobile computing device is turned off.

One embodiment of the present invention is as a set of instructions in a code module resident in the RAM 24. Until required by the computer system, the set of instructions may be stored in another computer memory, such as the hard disk 26, on an optical disk for use in the CD ROM drive 32, a floppy disk for use in the floppy disk drive 27, or the flash ROM. As shown in the figure, the operating system 50 and the telephony client application program 108 are resident in the RAM 24. The operating system 50 functions to generate a graphical user interface on the display 14. The telephony client application program 108 performs telephone functionality, including generation of a telephony client window in the GUI. The GUI may be implemented, for example, as a Windows-compatible GUI. In some embodiments, it may be implemented via a web browser interface running on, for example, Microsoft Explorer or Mozilla Firefox.

Execution of sequences of the instructions in the application program 108 causes the processor 22 to perform various of the process elements described herein. In alternative embodiments, hard-wired circuitry may be used in place of, or in combination with, software instructions for implementation of some or all of the methods described herein. Thus, embodiments are not limited to any specific combination of hardware and software.

As will be explained in greater detail below, in certain embodiments of the present invention, the telephony client application 108 is maintained in flash ROM 23 during a power down mode. When the network interface 40 detects an incoming telephone call, it sends appropriate signals to wake up the microprocessor 22 and the power management system 33. In a quick boot process, the telephony client application program 108 is then loaded into RAM 24.

The processor 22 and the data storage device 26, 27, 32 in the computer 100 each may be, for example: (i) located entirely within a single computer or other computing device; or (ii) connected to each other by a remote communication medium, such as a serial port cable, telephone line or radio frequency transceiver. In one embodiment, the computer 100 may be implemented as one or more computers that are connected to a remote server computer, as will be explained in greater detail below.

FIG. 4 illustrates more particularly various components of a mobile computing device system in accordance with embodiments of the present invention. Shown are a network interface 40, I/O controller 402, a power management unit 33, a power supply 404, a battery backup 401, and a system unit 406, which includes, e.g., the processor 22.

As will be explained in greater detail below, the battery backup 401 provides backup power to the network interface 40 and the I/O interface 402 while the mobile computing device is powered off. The network interface 40 and the I/O controller 402 provide signals to the power management unit 33 indicating that a telephony wake event has occurred. In the case of the network interface 40, this is reception of an incoming call packet, as will be explained in greater detail below. In the case of the I/O controller 402, it is activation of the wake up control 222, as will be explained in greater detail below. In response to the wake up signals, the power management system 33 causes the power supply to provide power to one or more components of the system unit (CPU) 406 and other system components. The CPU 406 also wakes and loads the telephony client from flash ROM to RAM.

Operation of an embodiment of the present invention is illustrated schematically with reference to FIG. 5. Shown in FIG. 5 are various components of the mobile computing device 104. As noted above, the mobile computing device 104 may be turned off, if no activity has been detected for a predetermined period, or may be turned off manually. The power management system 33 (FIG. 3) may still provide minimal power, however, via the battery backup 401, to the network interface 40 and/or the I/O interfaces 28/29. In addition, the power management system 33 implements, or is in communication with, a password protection system and password bypass system 502 in accordance with embodiments of the present invention.

In operation, the network interface 40 detects an incoming telephone call. This can include, for example, the network interface 40 detecting predetermined signals, such as SIP or H.323 call setup signals. For example, the network interface 40 may compare the signal with known signal and, if there is a match, the network interface 40 sends a signal to the power management system 33 and/or the CPU 22 indicating that a call is being received and that a power up/quick boot process is to be undertaken.

In certain embodiments, the signaling from the network interface 40 is used by the power management system 33 and/or CPU 22 to identify that an incoming call is being received and bypass a security system 502. For example, if a power-on password is required to be received as user input via the I/O 28/29, then detection or identification of an incoming telephone call can bypass that requirement. Thus the system may be allowed to power up and boot and the telephony client 108 may be transferred to RAM 24 without entering the password, but only if the detected signaling is an incoming call. That is, the password bypass unit 502 must determine from the network interface 40 that an incoming telephone call is being received. If it is, it can override the password security system to allow power on and allow the computer to boot. Once the computer has booted, telephony operation is allowed. It is noted that the quick boot process typically is only a boot of those components necessary for telephony operation and is not a complete boot of the computer system. It is further noted that, depending on the embodiment, access to the rest of the computer may be restricted; thus access is allowed only for reception of the incoming call.

Making a telephone call when the system is off and to bypass password entry when an emergency call is to be made is similar. For example, as noted above, the user may press a wake up control 222 on the clamshell lid 103. This is detected by the I/O interface and may cause the system to present or load an interface in which he can either enter a password to access the system, or select an emergency number control (e.g., FIG. 6A-FIG 6C). Alternatively, the system may simply quickboot and dial the number automtically.

If he selects the emergency number control, the password bypass unit 502 will override the password entry and allow power-on and the telephony client 108 will load and he can call out to the emergency number alone, without entering the password. Alternatively, the system can provide a text input for the user to enter the emergency number, or a country specific emergency number. If the country specific number is entered, the system can compare the number to a table (not shown) with valid international emergency numbers to prevent unauthorized access. If the emergency number is not pre-loaded or otherwise preconfigured, the emergency number may be determined using, for example, the system and method for determining the emergency number in co-pending U.S. patent application Ser. No. 07P10928, filed concurrently herewith, which is hereby incorporated by reference in its entirety as if fully set forth herein.

Turning now to FIG. 6A, a diagram of an exemplary graphical user interface that may be used when making an outgoing call is shown. As noted above, in some embodiments of the present invention, a security system based on password entry is provided which prevents access to computer functions unless the password is provided. Embodiments of the present invention, however, allow emergency calls to be made without entry of the password.

In some embodiments, when the user selects the wake control 222, an interface is provided, such as that shown in FIG. 6A. In particular, as shown, the interface 602 provides a password option 604 or an emergency call option 606. The user may enter the password and be given access to the entire computer. However, if the user enters an emergency number, the emergency number will be called by bypassing password entry, as discussed above. Alternatively, the user could simply select an emergency number call out using control 608.

In other embodiments, as shown in FIG. 6B, the interface 607 may be provided. The interface 607 is a simple prompt for entering a number. If the number entered is an emergency number, it will be dialed; otherwise, a password entry prompt will be provided.

In other embodiments, the wake control 222 and the emergency number selection control 608 are the same, as shown in FIG. 6C. That is, instead of allowing both password entry and emergency call out selection, the wake control 222 could simply function to wake and call the emergency number. As noted above, the number may be entered by the user or retrieved from memory.

Figure 7:
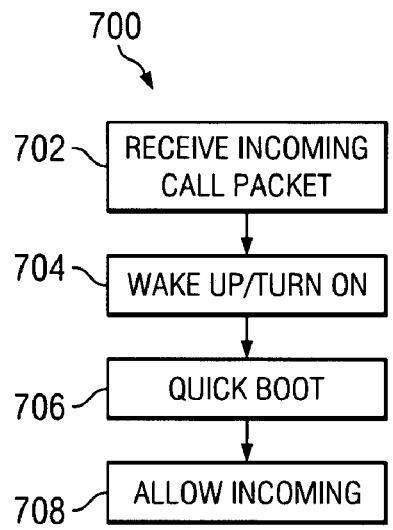
FIG. 7 is a flowchart illustrating operation of an embodiment of the present invention.

FIG. 7 illustrates a flowchart 700 of an embodiment of the present invention. The particular arrangement of elements in the flowchart 700 is not meant to imply a fixed order to the elements; embodiments can be practiced in any order that is practicable.

Initially, in a step 702, the network interface 40 receives an incoming telephony call setup packet. As discussed above, this may be a SIP or H.323 call setup packet, or other predetermined call setup packet. In a step 704, the network interface 40 causes the power management unit 33 and the CPU 22 to wake up and/or turn on. In some embodiments, as discussed above, this can include bypassing a security system 502. In a step 706, the telephony client application 108 boots from flash ROM into RAM. Finally, in a step 708, the incoming call is received.

Figure 8:
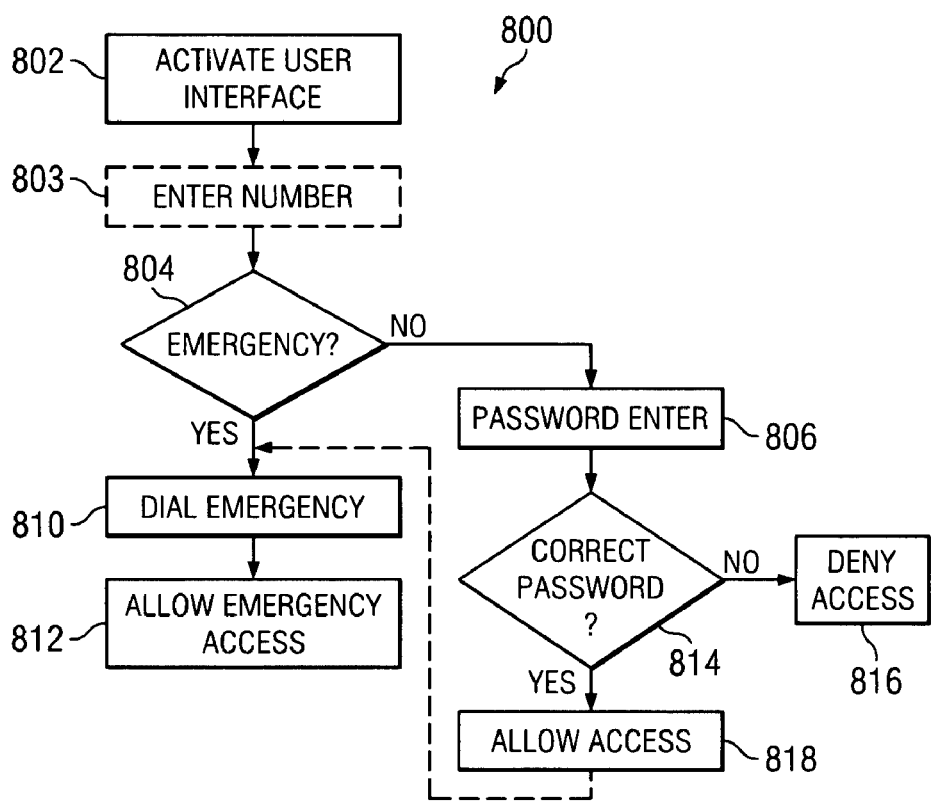
FIG. 8 is a flowchart illustrating operation of an embodiment of the present invention.

FIG. 8 illustrates a flowchart 800 of an embodiment of the present invention. The particular arrangement of elements in the flowchart 800 is not meant to imply a fixed order to the elements; embodiments can be practiced in any order that is practicable.

In a process step 802, a user can activate the wake up control user interface, such as user interface 222. As discussed above, the user interface 222 can be provided with a battery backup when the mobile computing device is turned off. The user interface detects the input and, in some embodiments, is operable to provide a dialing option, i.e., allowing the user to enter an emergency number, as shown at process step 803, as well as password check or bypass functions. That is, sufficient power may be provided by the power management system 33 (or battery backup) and a quickboot process may be activated such that the functions may load to RAM. The dialing option at 803 may be provided via a dialing keypad in the wake up control 222 itself, or in association with the GUI 202. In a process step 804, the system determines if the call is to an emergency number. For example, in some embodiments, the user can enter a password or select or enter an emergency number. In other embodiments, the user can enter a number; the system determines if it is an emergency number, e.g., by a local database lookup. In other embodiments, simple activation of the wake up control 222 will let the system know that an emergency call is to be made.

In a process step 810, if the call is an emergency call, the emergency number can be dialed (or entered and dialed). As discussed above, this can include a bypassing or overriding of the security system. As discussed above, this can include the system determining a local country emergency telephone number or accessing a pre-set number. In a step 812, the telephony client 108 is loaded to allow the emergency call access.

If, in process step 804, the user has selected "password," or the system otherwise determines that the call is not an emergency call, then he can enter it in a step 806. In a step 814, the password protection or security system will check to see if the password is correct. If not, then access is denied, in a step 816. Otherwise, it is allowed, in a process step 818; if desired, the user can use full access to dial the emergency number, as shown at process steps 810, 812.

As noted above, embodiments of the present invention allow for incorporating presence information or presence states into the wake up procedure. In particular, according to some embodiments, the mobile computing device may include a presence client that can be used to set presence status. In such a case, the network interface may be provided with the user's presence information. When the incoming call packet is received, the network interface can check if the user is deemed "present" or "in office" or other state indicative of availability. If so, then the network interface will wake up the computer and the call can be received, as discussed above.

In some embodiments, potential presence states or device contexts may include "available," "non-available," "busy," "away," "unknown," "partially available" (e.g., a device may be "busy" on a voice channel but available on an instant messaging channel), "be right back," "present," "not present," etc. In some embodiments, different applications may be used to set, monitor or change a device context for a device. For example, software operating on a computer may allow an identity to indicate manually or automatically that the computer is unavailable for email, instant messaging, file transfer or other communications at the current time, at a specific later time, during a time range, etc. As another example, a wireless and instant messaging capable PDA may be considered as having a device context as "available" by a presence and availability service 114 (FIG. 1) when the PDA is online and a device context of "unavailable" by the presence and availability service 114 when the PDA is offline. In addition, a telephony program may define a user as "busy" when he is active with another call.

Figure 9:
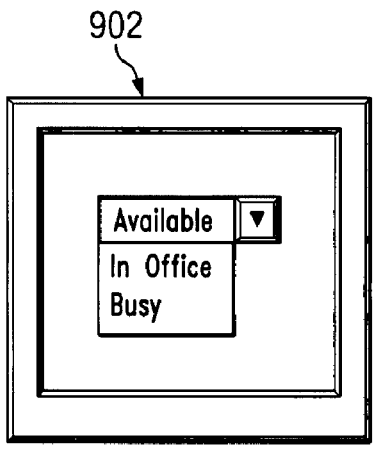
FIG. 9 illustrates an exemplary user interface for use with embodiments of the present invention.

FIG. 9 illustrates an exemplary user interface that may be used to define a user's current presence state. In the example shown, a drop down menu 902 with predetermined choices is provided. As illustrated, the choices include Available, In Office, Busy, and the like. In operation, the user makes the choice of his status prior to closing down the device, i.e., letting it go into power down or power-off mode. The status is received or is readable by the system when a power on determination is made, as will be described in greater detail below.

Figure 10:
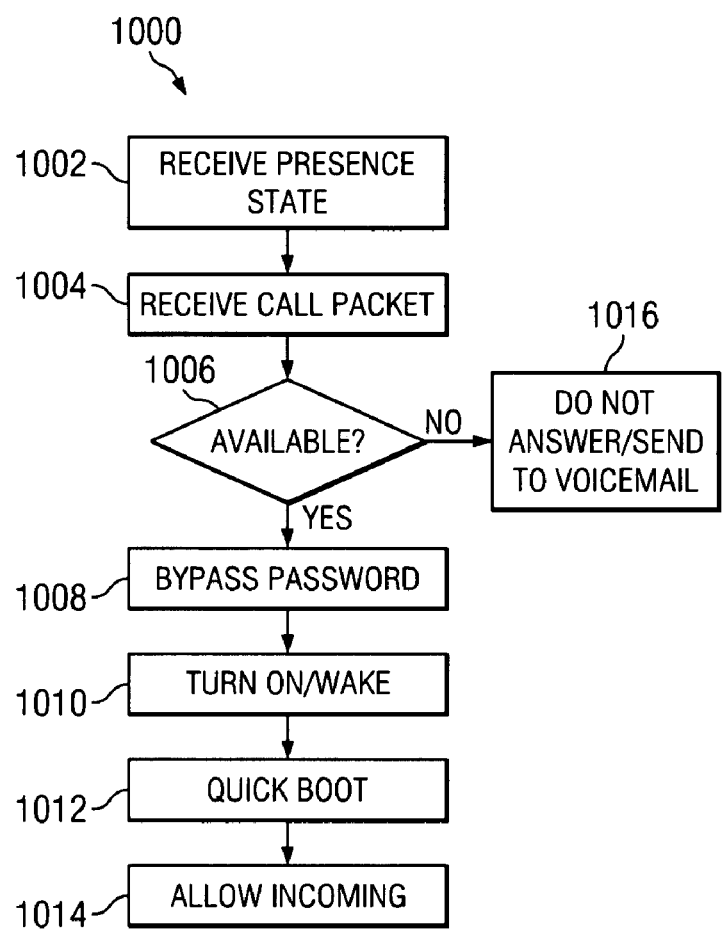
FIG. 10 is a flowchart illustrating operation of an embodiment of the present invention.

FIG. 10 illustrates a flowchart 1000 of an embodiment of the present invention. The particular arrangement of elements in the flowchart 1000 is not meant to imply a fixed order to the elements; embodiments can be practiced in any order that is practicable.

In a step 1002, the network interface can receive the current presence state of the device or the device user. For example, as noted above, an exemplary presence state could be "Available." In some embodiments, the presence state may be set by the presence and availability client 112 and transferred to the network interface 40 prior to powering down the computer. The last power on presence state will then be the one used by the network interface if an incoming call is received.

In a step 1004, while the mobile computing device is turned off, the network interface 40 receives an incoming call packet. As discussed above, this can include, for example, a SIP or an H.323 call setup message or messages. In a step 1006, the network interface 40 accesses the presence state and determines if the current presence state is one that corresponds to user availability. If it does not, then in a step 1014, the call is not answered (or is answered to a phone mail system).

If, however, the user is available, then in a step 1006, the password entry is bypassed in a step 1008 and the system is turned on, in a step 1010, in a manner similar to that described above. In a step 1012, the system performs a quick boot which includes, for example, loading the telephony client into RAM and booting enough of the computer to operate the client 108. Finally, in a step 1014, the incoming call is answered and allowed to be served by the client 108.

While specific implementations and hardware/software configurations for the mobile computing device have been illustrated, it should be noted that other implementations and hardware configurations are possible and that no specific implementation or hardware/software configuration is needed. Thus, not all of the components illustrated may be needed for the mobile computing device implementing the methods disclosed herein.

As used herein, whether in the above description or the following claims, the terms "comprising," "including," "carrying," "having," "containing," "involving," and the like are to be understood to be open-ended, that is, to mean including but not limited to. Only the transitional phrases "consisting of" and "consisting essentially of," respectively, shall be considered exclusionary transitional phrases, as set forth, with respect to claims, in the United States Patent Office Manual of Patent Examining Procedures (Eighth Edition, August 2001 as revised October 2006), Section 2111.03.

Any use of ordinal terms such as "first," "second," "third," etc., in the claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

The above described embodiments are intended to illustrate the principles of the invention, but not to limit the scope of the invention. Various other embodiments and modifications to these preferred embodiments may be made by those skilled in the art without departing from the scope of the present invention.

What is claimed is:

1. A method comprising:
a network interface of a user device detecting an incoming call at the user device while the user device is in an off state, the network interface comprising an interface that is operable while the user device is in the off state;
the network interface bypassing a security access system of the user device in response to the detecting of the incoming call;
the network interface causing a telephony application stored on a non-transitory computer readable medium to load on the user device and causing only a portion of a computer system of the user device to load on the user device such that the telephony application is operable while a remaining portion of the computer system of the user device remains unloaded; and
receiving the incoming call at the telephony application such that a user associated with the user device may communicate with a caller of the incoming call via the telephony application.

2. The method of claim 1 further comprising:
accessing presence status information associated with the user device; and
determining if the presence status information corresponds to the user device being available; and
if the user device is determined to be available based on the presence status information, bypassing the security access system of the user device and forwarding the incoming call to the telephony application.

3. The method of claim 2 wherein the accessing of the presence status information associated with the user device comprises the user device accessing the presence status information when the user device is placed in an on state.

4. The method of claim 2 further comprising a presence and availability client stored on a second non-transitory computer readable medium transferring the presence status information associated with the user device to the network interface of the user device.

5. The method of claim 4 further comprising the presence and availability client receiving an input comprising the presence status information associated with the user device from the user of the user device.

6. The method of claim 1 wherein the network interface has a back-up power source that is independent of a main power source of the user device such that the network interface may remain active while the user device is in the off state.

7. The method of claim 1 wherein the incoming call is a call according to Session Initiation Protocol (SIP) or H.323 Protocol.

8. The method of claim 1 wherein if the user device is determined not to be available based on the presence status information associated with the user device, forwarding the incoming call a phone mail system.

9. A telecommunication device, comprising:
a device interface that is operable while the telecommunications device is in an off state:
an operating system;
a security access system; and
a telephony application stored on a non-transitory computer readable medium; and
wherein the device interface detects an incoming call at the telecommunication device while the telecommunication device is in a power-off state; and
wherein the device interface bypasses the security access system in response to detection of the incoming call; and
wherein the device interface causing the telephony application to be loaded at the telecommunications device; and
wherein the device interface causing a portion of the operating system of the telecommunications device to be loaded such that the telephony application is operable on the telecommunications device while a remaining portion of the operating system of the telecommunications device remains unloaded; and
wherein the telephony application receives the incoming call such that a user associated with the user device may communicate with a caller of the incoming call via the telephony application.

10. The telecommunication device of claim 9 wherein the device interface accesses presence status information associated with the telecommunications device, the device interface determines if the presence status information corresponds to the telecommunications device being available, and if the device interface determines that the telecommunications device is available, the device interface bypasses the security access system.

11. The telecommunications device of claim 10 wherein a presence and availability client transfers the presence status information associated with the telecommunications device to the device interface.

12. The telecommunications device of claim 10 wherein the device interface accesses the presence status information associated with the telecommunications device when the telecommunications device is placed in an on state.

13. The telecommunications device of claim 9 wherein the non-transitory computer readable medium on which the telephony application is stored, comprises Random Access Memory (RAM) in the telecommunications device.

14. The telecommunications device of claim 9 wherein the device interface causes a portion of the operating system of the telecommunications device to be loaded such that the telephony application is operable on the telecommunications device while a remaining portion of the operating system of the telecommunications device remains unloaded in response to receiving an input of an emergency call number at a dialing option of the telecommunications device.

15. A method comprising:
activating a user interface of a user device, the user interface comprising a control interface that is activated when the user device is in an off state;
the user interface providing a dialing option at the user device;

the user interface receiving a first input from the dialing option;
the user interface determining if the received first input is an emergency number;
if the received first input is an emergency number:
   the user interface causing a telephony application to load on the user device,
   the user interface causing a portion of a computer system of the user device to be loaded such that the telephony application is operable on the user device while a remaining portion of the computer system of the user device remains unloaded, and
   the user interface causing the user device to initiate a call to the emergency number after bypassing a security access system of the user device; and
if the received first input is not an emergency number:
   the user interface providing a password entry prompt,
   the user interface receiving a second input in response to the password entry prompt,
   the user interface determining if the second received input matches a stored password, and
   if the second received input matches the stored password, the user interface causing the user device to initiate an outgoing call to a location specified by the received first input.

16. The method of claim 15 wherein the user interface causing the user device to initiate the outgoing call comprises the user device changing to an on state and initiating the outgoing call.

17. The method of claim 16 further comprising transferring presence status information associated with the user device to the user interface prior to the user device returning to the off state.

18. The method of claim 15 wherein the user device comprises a mobile computing device and the mobile computing device is a computer, a PDA, a telephone, or a cellular telephone.

19. The method of claim 15 wherein the outgoing call is a call according to an Internet Protocol and wherein the Internet Protocol is Session Initiation Protocol (SIP) or H.323 Protocol.

20. The method of claim 15 wherein the user interface determining if the received first input is an emergency number comprises comparing the first received input to a table comprising valid international emergency numbers.

\* \* \* \* \*